(12) United States Patent
Kanczuga et al.

(10) Patent No.: US 12,093,226 B2
(45) Date of Patent: Sep. 17, 2024

(54) SYSTEM AND METHOD FOR INITIATING DATA RECORD CREATION AT A THIRD PARTY SERVER

(71) Applicant: The Toronto-Dominion Bank, Toronto (CA)

(72) Inventors: Katherine Kanczuga, Toronto (CA); Shishir Dattatraya Bhat, Toronto (CA); Sumathi Seetharaman, Etobicoke (CA)

(73) Assignee: The Toronto-Dominion Bank, Totonto (CA)

( * ) Notice: Subject to any disclaimer, the term of this patent is extended or adjusted under 35 U.S.C. 154(b) by 416 days.

(21) Appl. No.: 17/476,863

(22) Filed: Sep. 16, 2021

(65) Prior Publication Data
US 2023/0078168 A1   Mar. 16, 2023

(51) Int. Cl.
*G06F 16/00*   (2019.01)
*G06F 9/54*    (2006.01)
*G06F 16/21*   (2019.01)

(52) U.S. Cl.
CPC ............... *G06F 16/21* (2019.01); *G06F 9/54* (2013.01)

(58) Field of Classification Search
CPC ............ G06F 16/21; G06F 9/54; G06F 16/23; G06Q 20/14; G06Q 30/04
See application file for complete search history.

(56) References Cited

U.S. PATENT DOCUMENTS

| | | | |
|---|---|---|---|
| 10,671,749 B2 | 6/2020 | Felice-Steele et al. | |
| 10,963,589 B1 | 3/2021 | Fakhraie et al. | |
| 10,992,679 B1 | 4/2021 | Fakhraie et al. | |
| 2012/0136780 A1 | 5/2012 | El-Awady et al. | |
| 2013/0346302 A1 | 12/2013 | Purves et al. | |
| 2014/0257852 A1* | 9/2014 | Walker | G06Q 10/10 705/3 |
| 2017/0374425 A1* | 12/2017 | Disley | G06Q 10/101 |
| 2019/0012646 A1 | 1/2019 | Seidl et al. | |
| 2020/0402071 A1 | 12/2020 | Bruhnke et al. | |
| 2021/0056509 A1* | 2/2021 | Lindy | G06Q 30/04 |

* cited by examiner

*Primary Examiner* — Paul Kim
(74) *Attorney, Agent, or Firm* — Rowand LLP

(57) ABSTRACT

A server computer system comprises a processor; a communications module coupled to the processor; and a memory coupled to the processor, the memory storing instructions that, when executed, configure the processor to generate a recommendation to create a data record at least at one third party server; send, via the communications module and to a computing device, a signal causing the computing device to display the recommendation, the recommendation including a selectable option to create the data record at the at least one third party server; receive, via the communications module and from the computing device, a signal indicating selection of the selectable option to create the data record at the at least one third party server; engage, via the communications module, the third party server to initiate creation of the data record; retrieve previously-obtained identity data required to create the data record; and provide, via the communications module and to the at least one third party server, the previously-obtained identity data to create the data record.

20 Claims, 15 Drawing Sheets

SYSTEM AND METHOD FOR INITIATING DATA RECORD CREATION AT A THIRD PARTY SERVER

TECHNICAL FIELD

The present application relates to systems and methods for initiating data record creation at a third party server.

BACKGROUND

Data records store data such as identity data. In some cases, data records require a minimum amount of identity data before they can be created.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
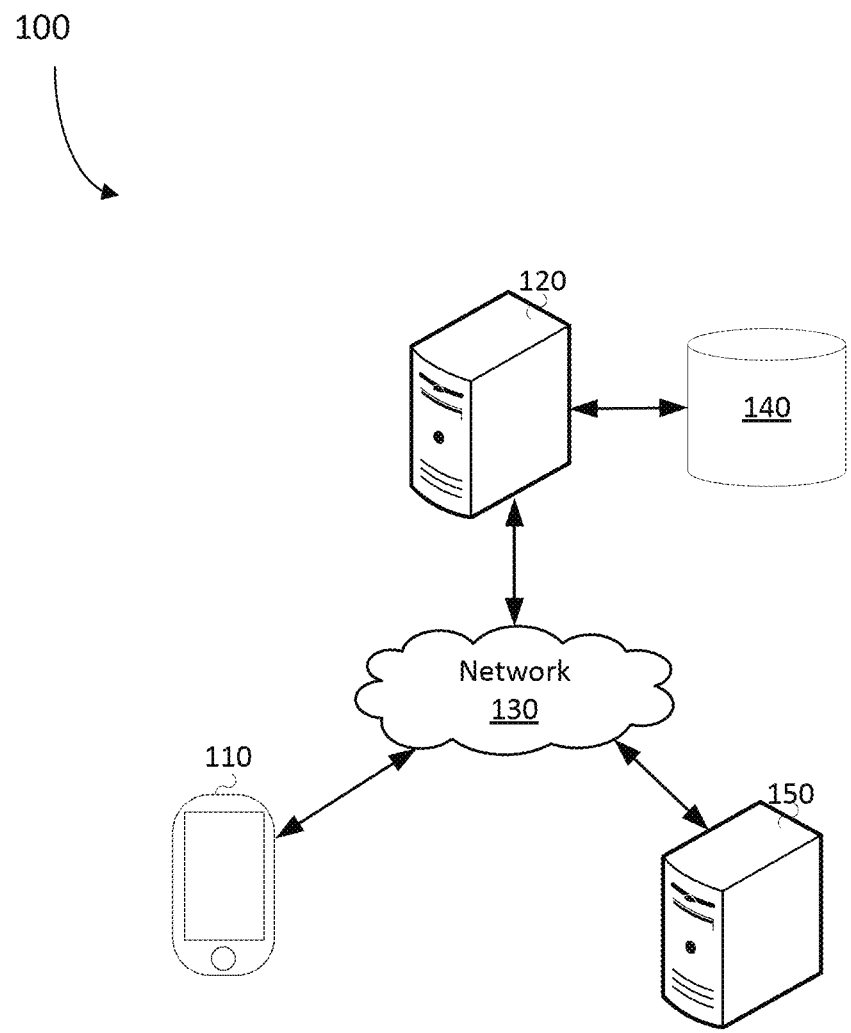
FIG. 1 is a schematic operation diagram illustrating an operating environment of an example embodiment.

In an aspect there is provided a server computer system comprising a processor; a communications module coupled to the processor; and a memory coupled to the processor, the memory storing instructions that, when executed, configure the processor to generate a recommendation to create a data record at least at one third party server; send, via the communications module and to a computing device, a signal causing the computing device to display the recommendation, the recommendation including a selectable option to create the data record at the at least one third party server; receive, via the communications module and from the computing device, a signal indicating selection of the selectable option to create the data record at the at least one third party server; engage, via the communications module, the third party server to initiate creation of the data record; retrieve previously-obtained identity data required to create the data record; and provide, via the communications module and to the at least one third party server, the previously-obtained identity data to create the data record.

In one or more embodiments, the previously-obtained identity data is retrieved from one or more of a data store, a digital identity network, or an application programming interface (API) associated with at least one additional third party server.

In one or more embodiments, the at least one additional third party server maintains a data record for a user associated with the computing device.

In one or more embodiments, the instructions, when executed, further configure the processor to determine that the previously-obtained identity data is not sufficient to complete the creation of the data record; send, via the communications module and to the computing device, a signal causing the computing device to display a request for identity data to complete the creation of the data record; receive, via the communications module and from the computing device, a signal that includes the requested identity data; and provide, via the communications module and to the at least one third party server, the requested identity data.

In one or more embodiments, when generating the recommendation to create the data record at the at least one third party server, the instructions, when executed, further configure the processor to determine one or more additional third party servers that maintain a data record for a user associated with the computing device; and generate the recommendation based on the one or more additional third party servers.

In one or more embodiments, the instructions, when executed, further configure the processor to obtain authentication information for one or more data records hosted by one or more additional third party servers; obtain, via the communications module and from the one or more additional third party servers, account data associated with the one or more data records; and send, via the communications module and to the computing device, a signal causing the computing device to update a bill management interface to include the account data.

In one or more embodiments, the instructions, when executed, further configure the processor to send, via the communications module and to the computing device, a signal causing the computing device to display a selectable option to close at least one of the one or more data records hosted by the one or more additional third party servers; receive, via the communications module and from the computing device, a signal indicating selection of the selectable option to close a particular data record hosted by a particular additional third party server; and send, via the communications module and to the particular additional third party server, a signal requesting that the particular data record be closed.

In one or more embodiments, the instructions, when executed, further configure the processor to engage an application programming interface (API) associated with the third party server to initiate the creation of the data record; generate an API request that includes the previously-obtained identity data; and send, via the communications module and to the API associated with the third party server, the generated API request.

In one or more embodiments, the instructions, when executed, further configure the processor to receive, via the communications module and from at least one third party server, a signal indicating confirmation of the creation of the data record; obtain, via the communications module and from the at least one third party server, account data associated with the account; and send, via the communications module and to the computing device, a signal causing the computing device to update a bill management interface to include the account data.

In one or more embodiments, the account data includes an amount owing and the signal causing the computing device to update the bill management interface causes the computing device to display a selectable option to submit payment based on the amount owing.

In one or more embodiments, the instructions, when executed, further configure the processor to send, via the communications module and to the third party server, a signal including a request to reduce a cost associated with the data record based on at least some of the previously-obtained identity data satisfying predefined criteria.

In another aspect there is provided a method comprising generating a recommendation to create a data record at least at one third party server; sending, to a computing device, a signal causing the computing device to display the recommendation, the recommendation including a selectable option to create the data record at the at least one third party server; receiving, from the computing device, a signal indicating selection of the selectable option to create the data record at the at least one third party server; engaging the third party server to initiate creation of the data record; retrieving previously-obtained identity data required to create the data record; and providing, to the at least one third party server, the previously-obtained identity data to create the data record.

In one or more embodiments, the previously-obtained identity data is retrieved from one or more of a data store, a digital identity network, or an application programming interface (API) associated with at least one additional third party server.

In one or more embodiments, the method further comprises determining that the previously-obtained identity data is not sufficient to complete the creation of the data record; sending, to the computing device, a signal causing the computing device to display a request for identity data to complete the creation of the data record; receiving, from the computing device, a signal that includes the requested identity data; and providing, to the at least one third party server, the requested identity data.

In one or more embodiments, generating the recommendation to create the data record at the at least one third party server includes determining one or more additional third party servers that maintain a data record for a user associated with the computing device; and generating the recommendation based on the one or more additional third party servers.

In one or more embodiments, the method further comprises obtaining authentication information for one or more data records hosted by one or more additional third party servers; obtaining, from the one or more additional third party servers, account data associated with the one or more data records; and sending, to the computing device, a signal causing the computing device to update a bill management interface to include the account data.

In one or more embodiments, the method further comprises sending, to the computing device, a signal causing the computing device to display a selectable option to close at least one of the one or more data records hosted by the one or more additional third party servers; receiving, from the computing device, a signal indicating selection of the selectable option to close a particular data record hosted by a particular additional third party server; and sending, to the particular additional third party server, a signal requesting that the particular data record be closed.

In one or more embodiments, the method further comprises engaging an application programming interface (API) associated with the third party server to initiate the creation of the data record; generating an API request that includes the previously-obtained identity data; and sending, via the communications module and to the API associated with the third party server, the generated API request.

In one or more embodiments, the method further comprises receiving, from at least one third party server, a signal indicating confirmation of the creation of the data record; obtaining, from the at least one third party server, account data associated with the account; and sending, to the computing device, a signal causing the computing device to update a bill management interface to include the account data.

In another aspect there is provided a non-transitory computer readable storage medium comprising processor-executable instructions which, when executed, configure a processor to generate a recommendation to create a data record at least at one third party server; send, via a communications module and to a computing device, a signal causing the computing device to display the recommendation, the recommendation including a selectable option to create the data record at the at least one third party server; receive, via the communications module and from the computing device, a signal indicating selection of the selectable option to create the data record at the at least one third party server; engage, via the communications module, the third party server to initiate creation of the data record; retrieve previously-obtained identity data required to create the data record; and provide, via the communications module and to the at least one third party server, the previously-obtained identity data to create the data record.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment. As shown, the system 100 includes a computing device 110 and a server computer system 120 coupled to one another through a network 130, which may include a public network such as the Internet and/or a private network. The computing device 110 and the server computer system 120 may be in geographically disparate locations. Put differently, the computing device 110 and the server computer system 120 may be located remote from one another.

The computing device 110 may take a variety of forms including, for example, a mobile communication device such as a smartphone, a tablet computer, a wearable computer (such as a head-mounted display or smartwatch), a laptop or desktop computer, or a computing device of another type. The computing device 110 may be associated with a user or customer having resources that are managed by or via the server computer system 120. For example, the server computer system 120 may be a financial institution server and the user may be a customer of a financial institution operating the financial institution server. The computing device 110 may store software instructions that cause the computing device 110 to establish communications with the server computer system 120.

The server computer system 120 may maintain a database 140 that includes various data records. For example, the server computer system 120 may be a financial institution server which may maintain customer bank accounts. In this example, a data record may, for example, reflect an amount of value stored in a particular account associated with a user. The amount of value may include a quantity of currency.

The database 140 may include data records for a plurality of resource accounts and at least some of the data records may define a quantity of resources associated with a user or customer. For example, the user that is associated with the computing device 110 may be associated with one or more resource accounts having one or more data records in the database 140. The data records may reflect a quantity of resources that are available to the user. Such resources may include owned resources and, in at least some embodiments, borrowed resources (e.g., resources available on credit). The quantity of resources that are available to or associated with a user may be reflected by a balance defined in an associated data record such as, for example, a bank balance. The resource accounts may include, for example, a chequing account, a savings account, a borrowing account such as for example a line of credit account, a credit card account, a loyalty point account, etc. As such, at least some of the data records may define a chequing account balance, a savings account balance, a line of credit account balance, a credit card account balance, a loyalty point account balance, etc.

The database 140 may additionally include data records for storing identity data of users or customers. The identity data may include, for example, a name, an email address, a social security number, an address, a phone number, etc. of the user. The identity data may include identity data previously-obtained to fulfil know-your-customer (KYC) requirements.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, a telecommunications network, or the like.

The computing device 110 is adapted to present a graphical user interface that allows for communication with the server computer system 120. For example, the computing device 110 may be adapted to receive, from the server computer system 120, a signal that causes the computing device 110 to display a bill management interface associated with a bill management application.

The system 100 may include a third party server 150 that maintains data records associated with one or more users. The third party server 150 may be associated with a third party that provides a particular service. For example, the third party server 150 may be associated with a streaming service provider, a utility service provider, an internet provider, a cable provider, a third party financial institution, a credit card provider, etc.

The data records maintained by the third party server 150 may represent accounts held by users or customers of the particular service. For example, the third party server 150 may be associated with a particular streaming service provider and as such a data record may represent an account held by a user for the particular streaming service. The data records may store account data which may include billing data representing a bill or cost for using the particular streaming service. The account data may additionally or alternatively include identity data of the user associated with the account such as for example a name, email address, address, phone number, etc. of the user.

The third party server 150 may require authentication information to access the data records and the authentication information may be provided, for example, in the form of a username/password or in the form of an access token.

The third party server 150 may be configured to communicate with the server computer system 120 via the network 130. The third party server 150 may provide account data and/or may create one or more data records in response to one or more requests received from the server computer system 120. In one or more embodiments, the third party server 150 may be associated with or may include an application programming interface (API) that may be configured to receive API calls from the server computer system 120. The API calls may include a request for account data and/or may include a request for creating a data record.

It will be appreciated that the system 100 may include additional third party servers 150.

Figure 2A:
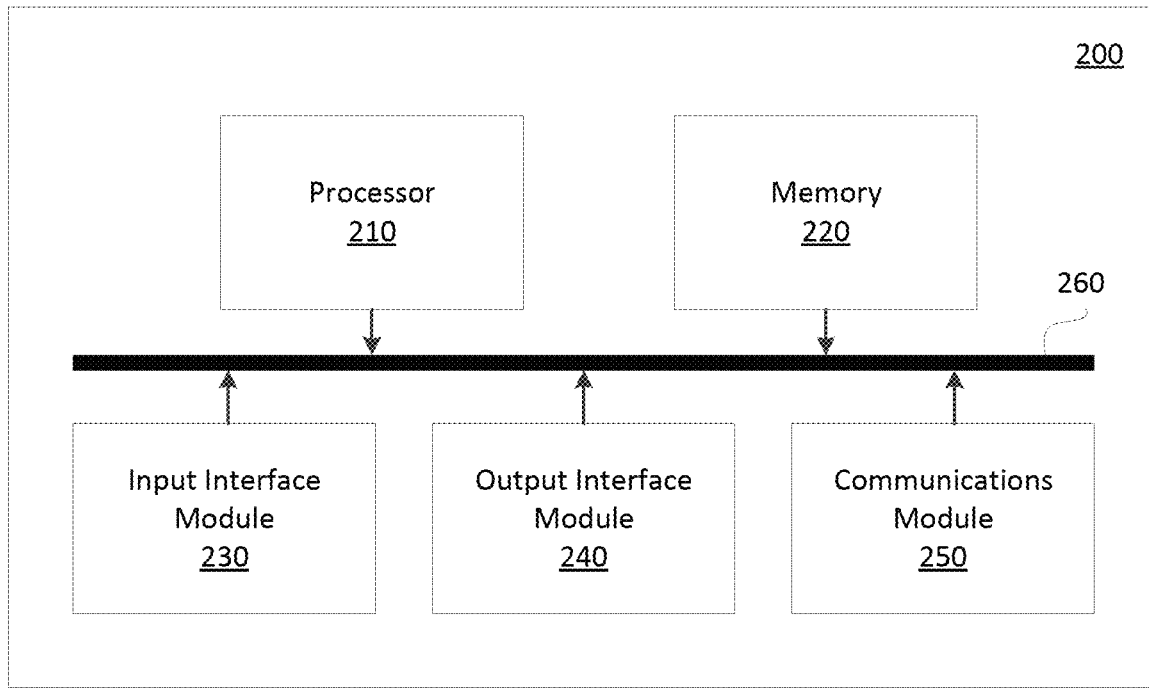
FIG. 2A is a high-level schematic diagram of an example computing device.

FIG. 2A is a high-level operation diagram of an example computer device 200. In some embodiments, the example computer device 200 may be exemplary of one or more of the computing device 110, the server computer system 120 and/or the third party server 150. The example computer device 200 includes a variety of modules. For example, as illustrated, the example computer device 200, may include a processor 210, a memory 220, an input interface module 230, an output interface module 240, and a communications module 250. As illustrated, the foregoing example modules of the example computer device 200 are in communication over a bus 260.

The processor 210 is a hardware processor. Processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computer device 200.

The input interface module 230 allows the example computer device 200 to receive input signals. Input signals may, for example, correspond to input received from a user. The input interface module 230 may serve to interconnect the example computer device 200 with one or more input devices. Input signals may be received from input devices by the input interface module 230. Input devices may, for example, include a touchscreen input, keyboard, trackball, or the like. In some embodiments, all or a portion of the input interface module 230 may be integrated with an input device. For example, the input interface module 230 may be integrated with one of the aforementioned example input devices.

The output interface module 240 allows the example computer device 200 to provide output signals. Some output signals may, for example, allow provision of output to a user. The output interface module 240 may serve to interconnect the example computer device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as for example a speaker, indicator lamps (such as for example light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computer device 200 to communicate with other electronic devices and/or various communications networks. For example, the communications module 250 may allow the example computer device 200 to send or receive communications signals. Communications signals may be sent or received according to one or more protocols or according to one or more standards. For example, the communications module 250 may allow the example computer device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computer device 200 to communicate using near-field communication (NFC), via Wi-Fi™, using Bluetooth™ or via some combination of one or more networks or protocols. Contactless payments may be made using NFC. In some embodiments, all or a portion of the communications module 250 may be integrated into a component of the example computer device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of memory 220.

Figure 2B:
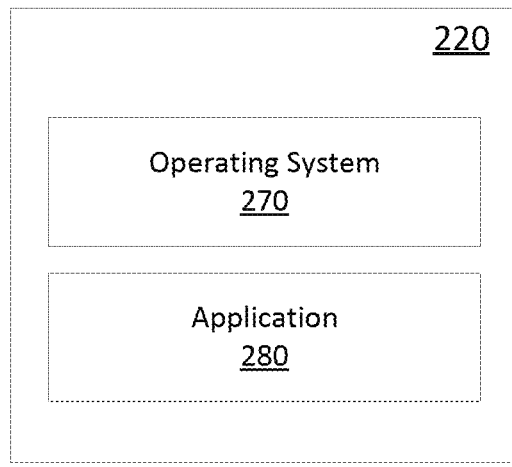
FIG. 2B is a schematic block diagram showing a simplified organization of software components stored in memory of the example computing device of FIG. 2A.

FIG. 2B depicts a simplified organization of software components stored in memory 220 of the example computer device 200. As illustrated these software components include an operating system 270 and an application 280.

The operating system 270 is software. The operating system 270 allows the application 280 to access the processor 210, the memory 220, the input interface module 230, the output interface module 240 and the communications module 250. The operating system 270 may be, for example, Apple iOS™, Google Android™, Linux™, Microsoft Windows™, or the like.

The application 280 adapts the example computer device 200, in combination with the operating system 270, to operate as a device performing specific functions. It will be appreciated that although a single application 280 is shown, in operation the memory 220 may include more than one application 280 and different applications 280 may perform different operations. For example, in at least some embodiments in which the computer device 200 is functioning as the computing device 110, the applications 280 may include a banking application. The banking application may be configured for secure communications with the server computer system 120 and may provide various banking functions such as, for example, the ability to display a quantum of value in one or more data records (e.g. display balances), configure or request that operations such as transfers of value (e.g. bill payments, email money transfers and other transfers) be performed, and other account management functions.

By way of further example, in at least some embodiments in which the computer device 200 functions as the computing device 110, the applications 280 may include a web browser, which may also be referred to as an Internet browser. In at least some such embodiments, the server computer system 120 may be a web server. The web server may cooperate with the web browser and may serve as an interface when the interface is requested through the web browser. For example, the web browser may serve as a mobile banking interface. The mobile banking interface may provide various banking functions such as, for example, the ability to display a quantum of value in one or more data records (e.g. display balances), configure or request that operations such as transfers of value (e.g. bill payments and other transfers) be performed, and other account management functions.

By way of further example, in at least some embodiments in which the computer device 200 functions as the computing device 110, the applications 280 may include a bill management application.

The bill management application may be configured for secure communications with the server computer system 120 and may provide various bill management functions such as for example the ability to link one or more accounts hosted by one or more third party servers, the ability to display account data associated with one or more linked accounts hosted by one or more third party servers, initiate the payment of a bill, configure or request that one or more accounts be opened, and other management functions. It will be appreciated that the bill management application may be provided as a separate application and/or may be associated with or available within the banking application or via mobile banking.

The user may access the bill management application on the computing device 110. For example, the user may select a selectable option within the mobile banking application that, when selected, directs the computing device 110 to the bill management application. As another example, the bill management application may be downloaded onto the computing device 110. As another example, the computing device 110 may access the bill management application using an internet browser resident on the computing device 110.

The user may be required to provide authentication information to access the bill management application. For example, using the computing device 110, the user may enter a username and password associated with their account and the computing device 110 may send a signal that includes the username and password to the server computer system 120. The server computer system 120 may verify the authentication information and may identify the account of the user.

Figure 3:
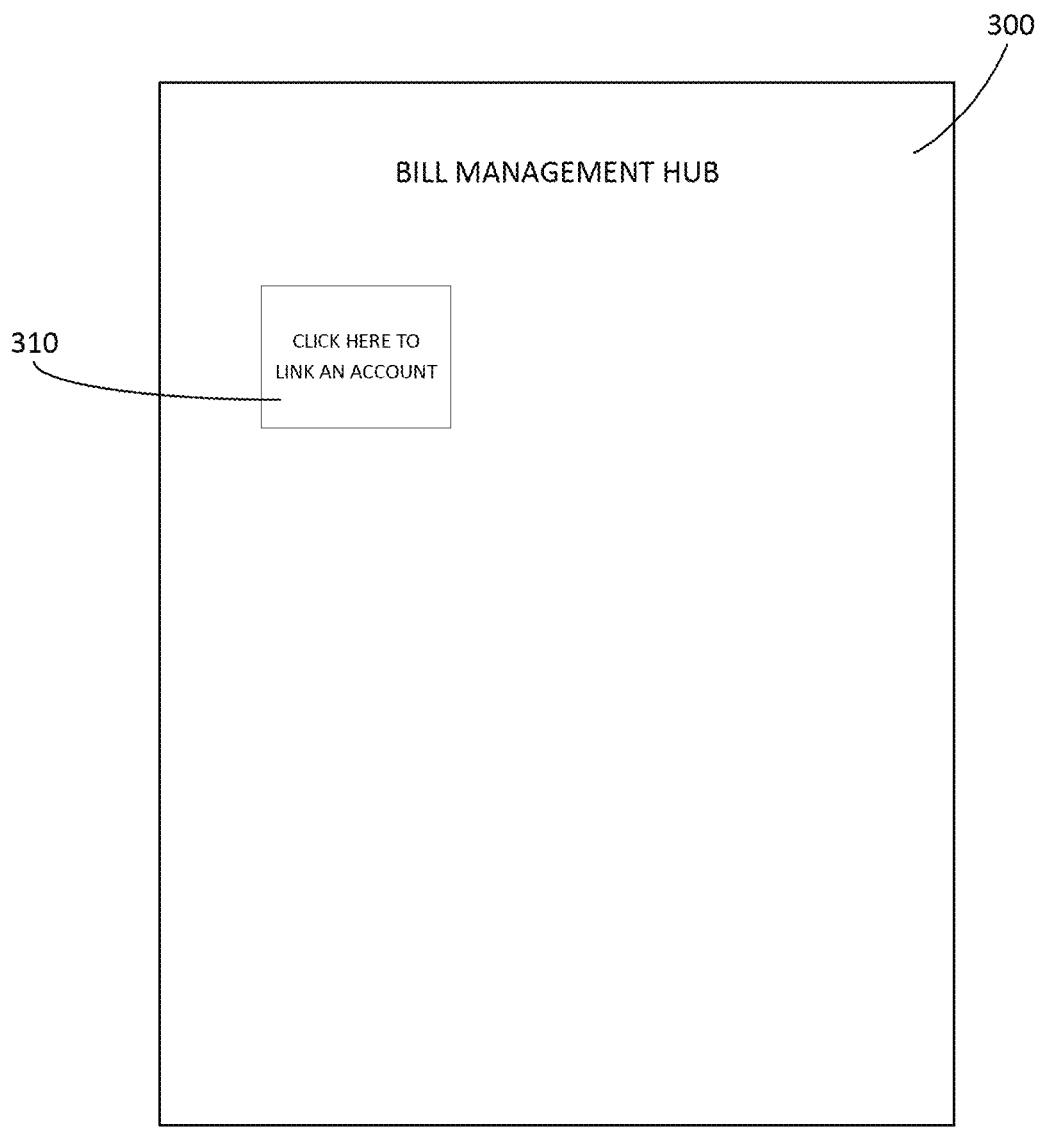
FIG. 3 is an example user interface.

Within the bill management application, the computing device 110 may display a bill management interface. An example bill management interface 300 is shown in FIG. 3. As can be seen, the bill management interface 300 includes a selectable option 310 that, when selected, sends a signal to the server computer system 120 indicating that the user would like to link one or more accounts hosted by one or more third party servers to the bill management application. The selectable option 310 may be selected by the user performing, for example, a tap gesture on a display screen of the computing device 110 at a location corresponding to the selectable option 310.

Responsive to the user selecting the selectable option 310, the computing device 110 displays a list of providers. The list of providers may be a predefined or predetermined list generated by the server computer system 120. The list of providers may include a number of providers for a number of services. For example, the list of providers may include a list of all known cable television providers. As another example, the list of providers may include a list of all known utility providers within a particular city. The list of providers may be a list of providers that the server computer system 120 is able to access account data therefrom. For example, the list of providers may only include providers that are associated with third party servers that the server computer system 120 is able to communicate with or has previously communicated with. The list of providers may additionally or alternatively include providers that provide an application programming interface (API) that may be engaged by the server computer system 120 to handle API requests.

Figure 4:
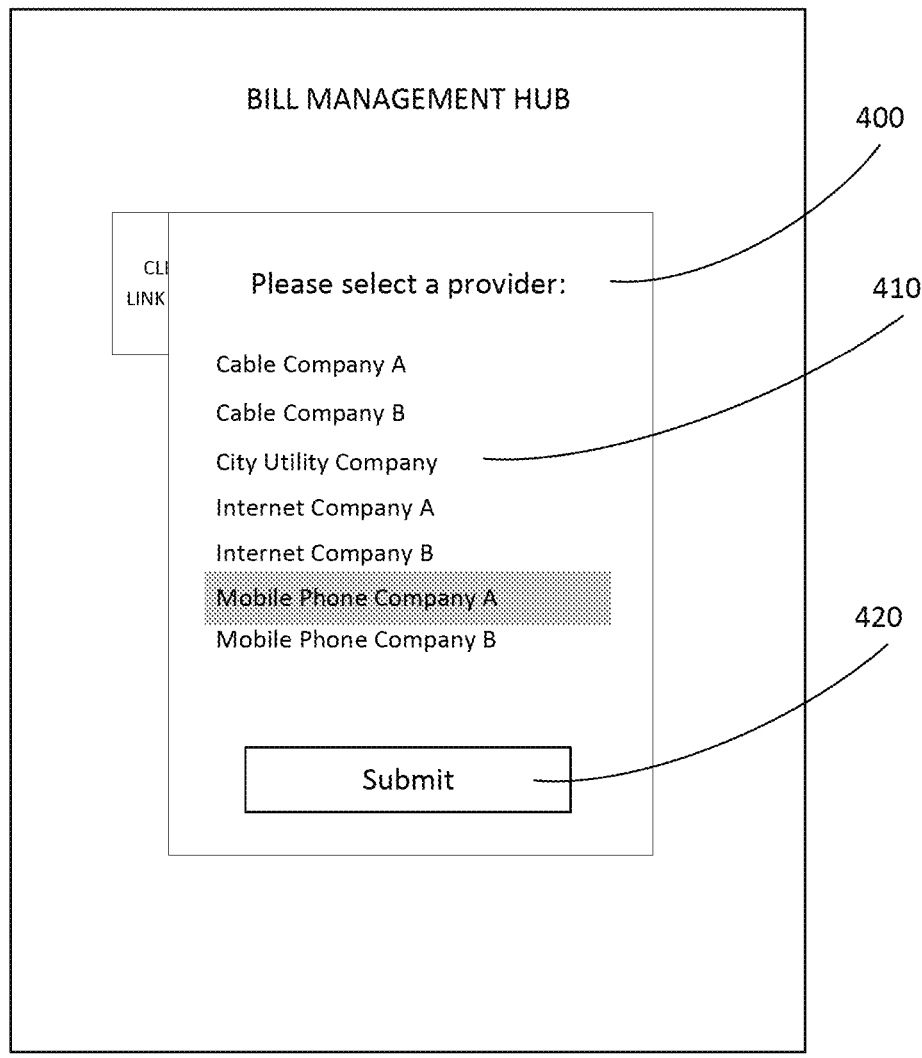
FIG. 4 is another example user interface.

An example interface 400 that includes a list of providers 410 is shown in FIG. 4. In this example, the interface 400 is displayed such that it overlaps the bill management interface 300 shown in FIG. 3. The list of providers 410 includes providers known to the server computer system 120. A provider may be selected by the user performing, for example, a tap gesture on a display screen of the computing device 110 at a location corresponding to one of the providers. The interface 400 includes a selectable option 420 that, when selected, causes the computing device 110 to send a signal to the server computer system 120 that includes information identifying the selected provider.

Figure 5:
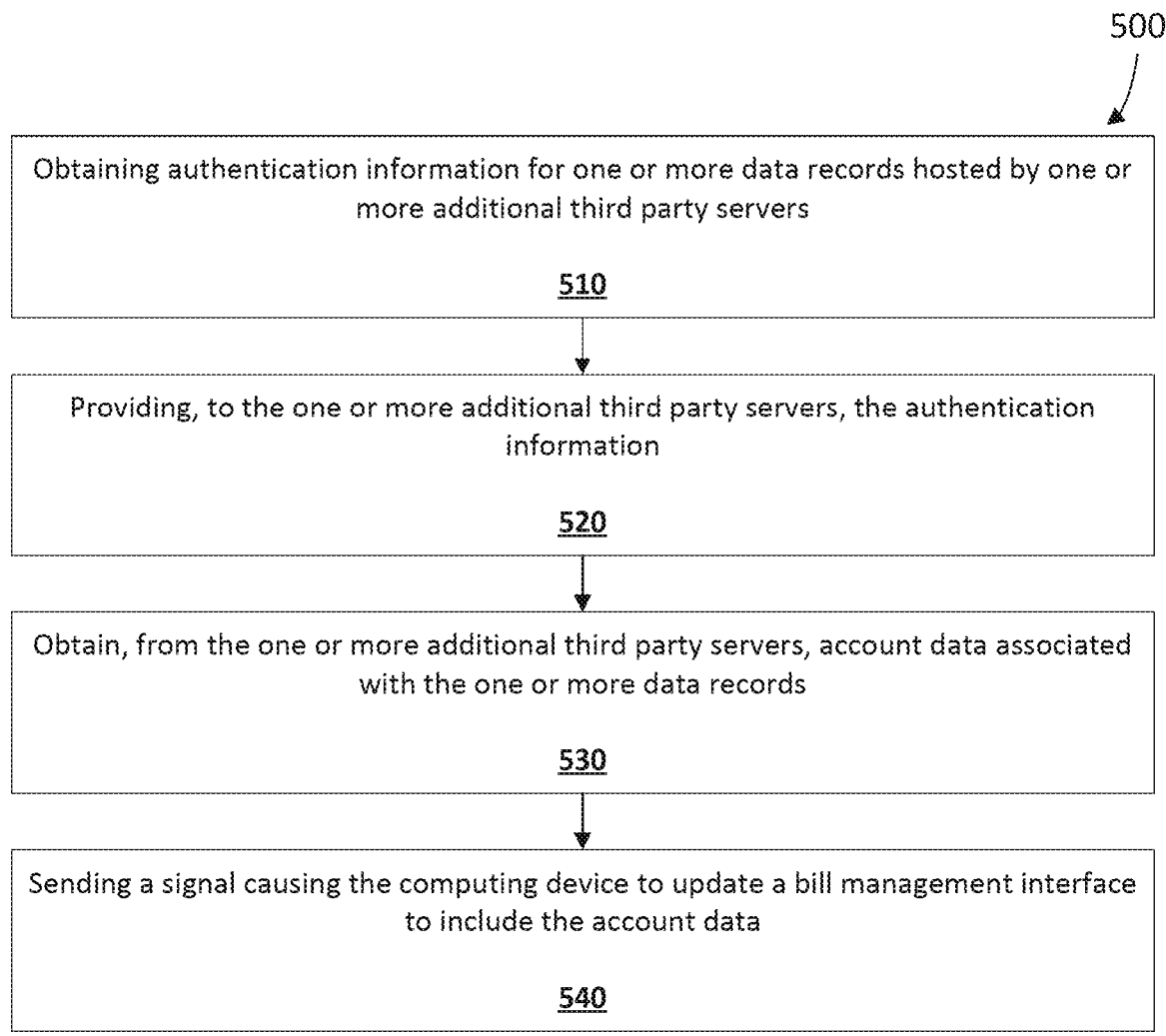
FIG. 5 shows, in flowchart form, an example method for linking an account hosted by a third party server.

Once a provider has been selected, a method for linking an account hosted by a third party server associated with the selected provider is performed. Reference is made to FIG. 5, which illustrates, in flowchart form, a method 500 for linking an account hosted by a third party server. The method 500 may be implemented by a computing device having suitable processor-executable instructions for causing the computing device to carry out the described operations. The method 500 may be implemented, in whole or in part, by the server computer system 120. The server computer system 120 may off-load some operations of the method 500 to the computing device 110 (FIG. 1).

The method 500 includes obtaining authentication information for one or more data records hosted by one or more additional third party servers (step 510).

The one or more data records hosted by the one or more additional third party servers may be associated with an account of the user.

In this embodiment, responsive to receiving the signal that includes information identifying the selected provider, the server computer system 120 sends a signal causing the computing device 110 to display an interface requesting that the user provide authentication information that may be used to access their account hosted by the selected provider. It will be appreciated that different providers may require different types of authentication information and as such the interface may be dependent on the selected provider. For example, a first provider may require a username and a password to access an account. As another example, a second provider may require an account number and a password to access an account. The server computer system 120 may store information identifying what type of authentication information is required for each provider in the database 140. For example, the server computer system 120 and/or the database 140 may maintain a lookup table that includes a list of the providers and the type of authentication information required to access the account. In this manner, the server computer system 120 may update, adjust or modify the interface prior to it being displayed on the computing device 110 to ensure that the requested authentication information is accurate for the selected provider.

Figure 6:
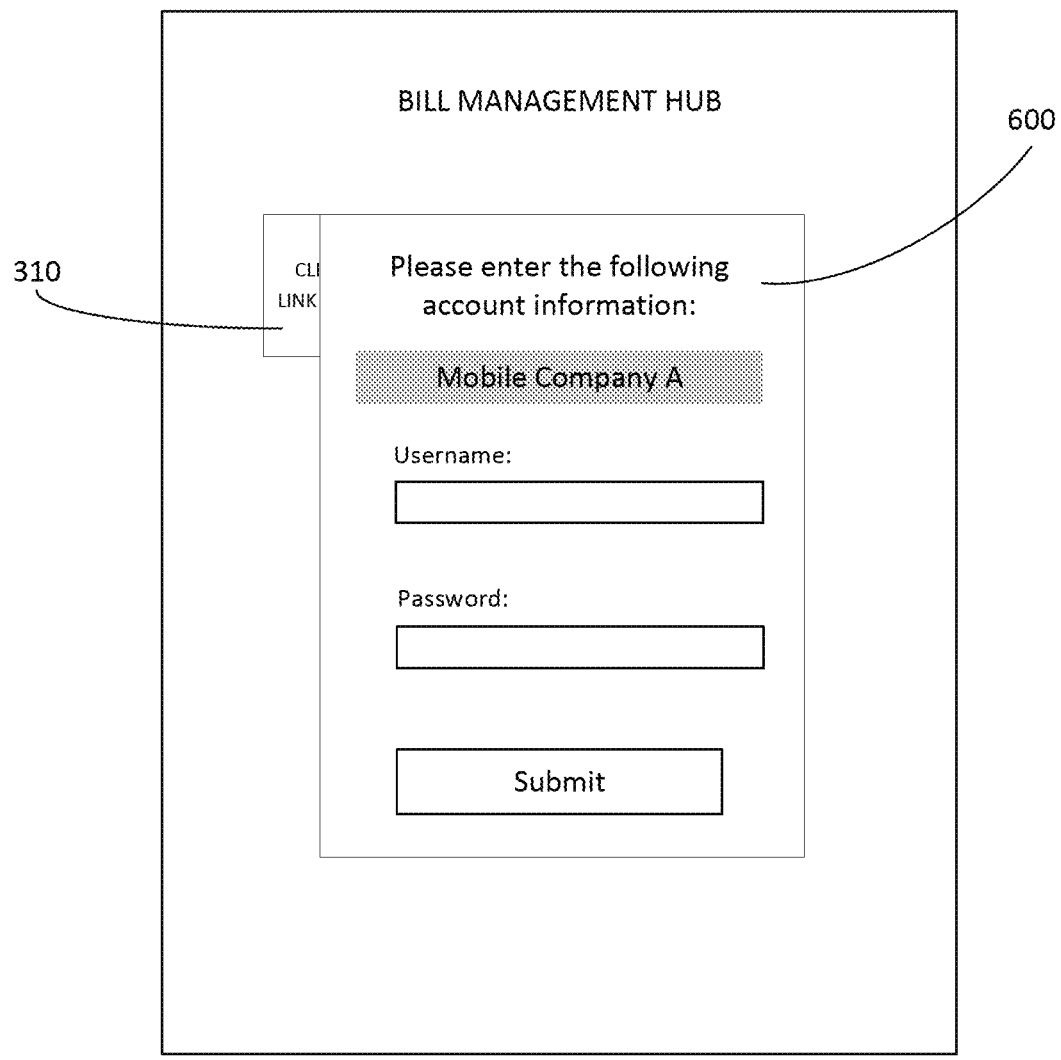
FIG. 6 is another example user interface.

An example interface 600 requesting that the user provide authentication information is shown in FIG. 6. As can be seen, the interface 600 includes a first input field 610 to enter a username associated with an account and a second input field 620 to enter a password associated with the account. The interface 600 includes a selectable option 630 that, when selected, sends a signal that includes the authentication information to the server computer system 120. Once received, the server computer system 120 may store the authentication information in memory. The user may complete the first input field 610 and the second input field 620 using, for example, a keyboard displayed on a display screen of the computing device 110.

The method 500 includes providing, to the one or more additional third party servers, the authentication information (step 520).

Once the authentication information has been received, the server computer system 120 uses the authentication information to access the account. Specifically, the server computer system 120 may send a signal that includes the authentication information and requests account data therefrom. In response, the third party server may analyze the authentication information to authenticate the server computer system 120 and identify the account. Once authenticated, the third party server may retrieve the requested account data and may send the requested account data to the server computer system 120.

In one or more embodiments, the server computer system 120 may engage an application programming interface (API) associated with the third party server and may send, for example, an API request that includes the authentication information and requests account data from the third party server.

The requested account data may include, for example, a balance owing on the account, a due date for paying the balance owing on the account, usage data such as for example internet usage data, etc.

The method 500 includes obtaining, from the one or more additional third party servers, account data associated with the one or more data records (step 530).

In this embodiment, the third party server may obtain the requested account data associated with the account. For example, the server computer system 120 may request account data that includes the balance of the account and a due date for when the balance is to be paid. As such, the third party server may obtain the balance of the account and the due date for when the balance is to be paid and may send the obtained account data to the server computer system 120. In this manner, the server computer system 120 obtains the account data.

The method 500 includes sending a signal causing the computing device to update the bill management interface to include the account data (step 540).

The server computer system 120 sends a signal that causes the computing device 110 to update the bill management interface to include the account data. For example, where the requested account data includes a balance of the account and a due date for when the balance is to be paid, the bill management interface may be updated to display the account data.

Figure 7:
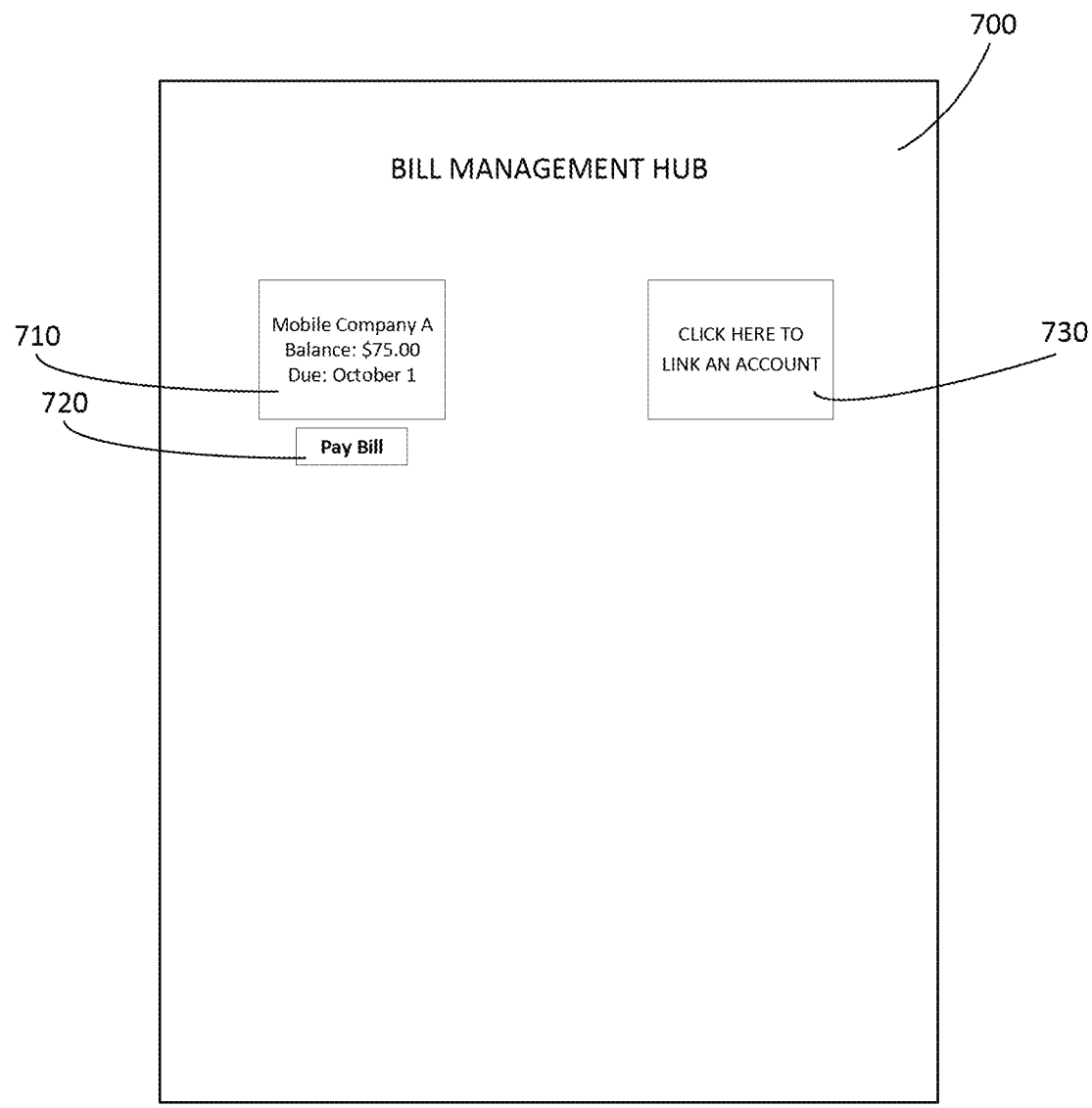
FIG. 7 is another example user interface.

An example interface 700 is shown in FIG. 7. As can be seen, the interface 700 includes a graphic element 710 that includes the account data. Specifically, the graphic element 710 includes identifying information of the provider ("Mobile Company A") and the account data which in this example is the balance of the account ($75.00) and the due date for when payment is to be made (October 1). The interface 700 includes a selectable option 720 that, when selected, initiates payment of the balance of the account. Once the user has selected the selectable option 720, the server computer system 120 may perform steps to transfer payment to the third party server. For example, the server computer system 120 may transfer payment from a chequing account of the user hosted by the server computer system 120 to the third party server. In this manner, the user may pay the bill simply by selecting the selectable option 720.

The graphic element 710 may be selectable by the user. For example, the user may perform a tap gesture on a display screen of the computing device 110 at a location corresponding to the graphic element 710. In one example, responsive to the user selecting the graphic element 710, the server computer system 120 may send additional account data for display on the computing device 110. For example, the server computer system 120 may send usage data obtained from the third party server and this may be displayed on the computing device 110. In another example, responsive to the user selecting the graphic element 710, the computing device 110 may be directed to a mobile application or web site hosted by the third party server. The user may then log into their account hosted by the third party server and may view additional account data. In another example, responsive to the user selecting the graphic element 710, the computing device 110 may display a settings or configuration page that may be used by the user to update or change one or more settings associated with their account. For example, the user may select which one of their bank accounts they would like to use to pay the bill. As another example, the user may schedule the paying of the bill such that the server computer system 120 may automatically pay the bill on a particular day that is set by the user. It will be appreciated that, responsive to the user scheduling the paying of the bill, the interface 700 may be updated to display information indicating that the user has scheduled bill payment.

The interface 700 may additionally include a selectable option 730 that may be selected by the user to link one or more additional accounts and this may be completed in manners similar to that described herein. Once completed, account data for all linked accounts may be displayed.

Figure 8:
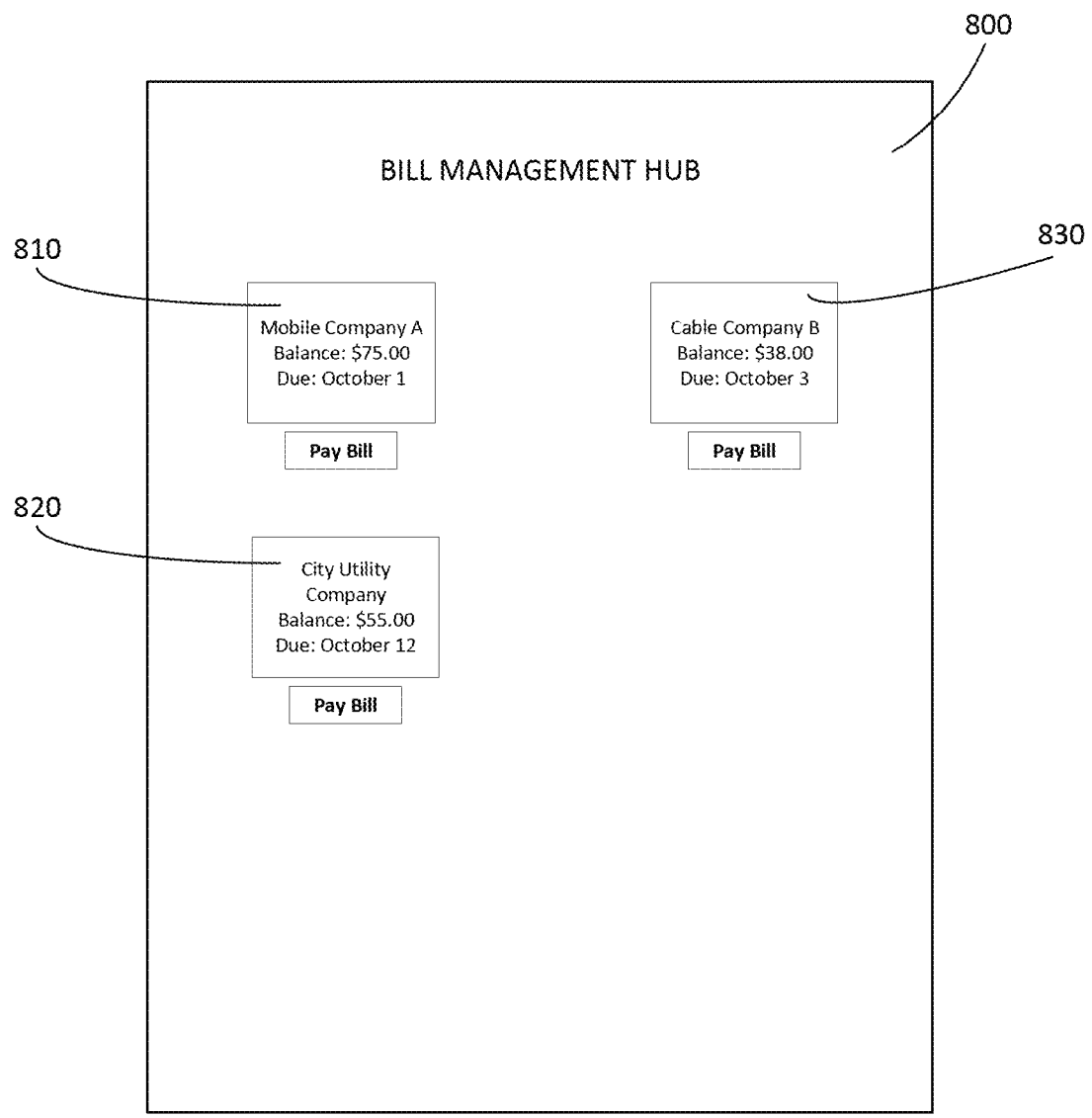
FIG. 8 is another example user interface.

An example interface 800 is shown in FIG. 8. As can be seen, the interface 800 includes graphic elements 810, 820, 830 each of which are associated with a particular account that has been linked to the bill management hub. In this manner, each time the user accesses the bill management hub, the server computer system 120 may perform steps to obtain up-to-date account data and display the up-to-date account data within the graphic elements 810, 820, 830.

As will be described in more detail, based on which accounts are linked by the user, the server computer system 120 may generate recommendations to create a data record at a particular third party server. Once the user has accepted a recommendation, data record creation may be initiated.

Figure 9:
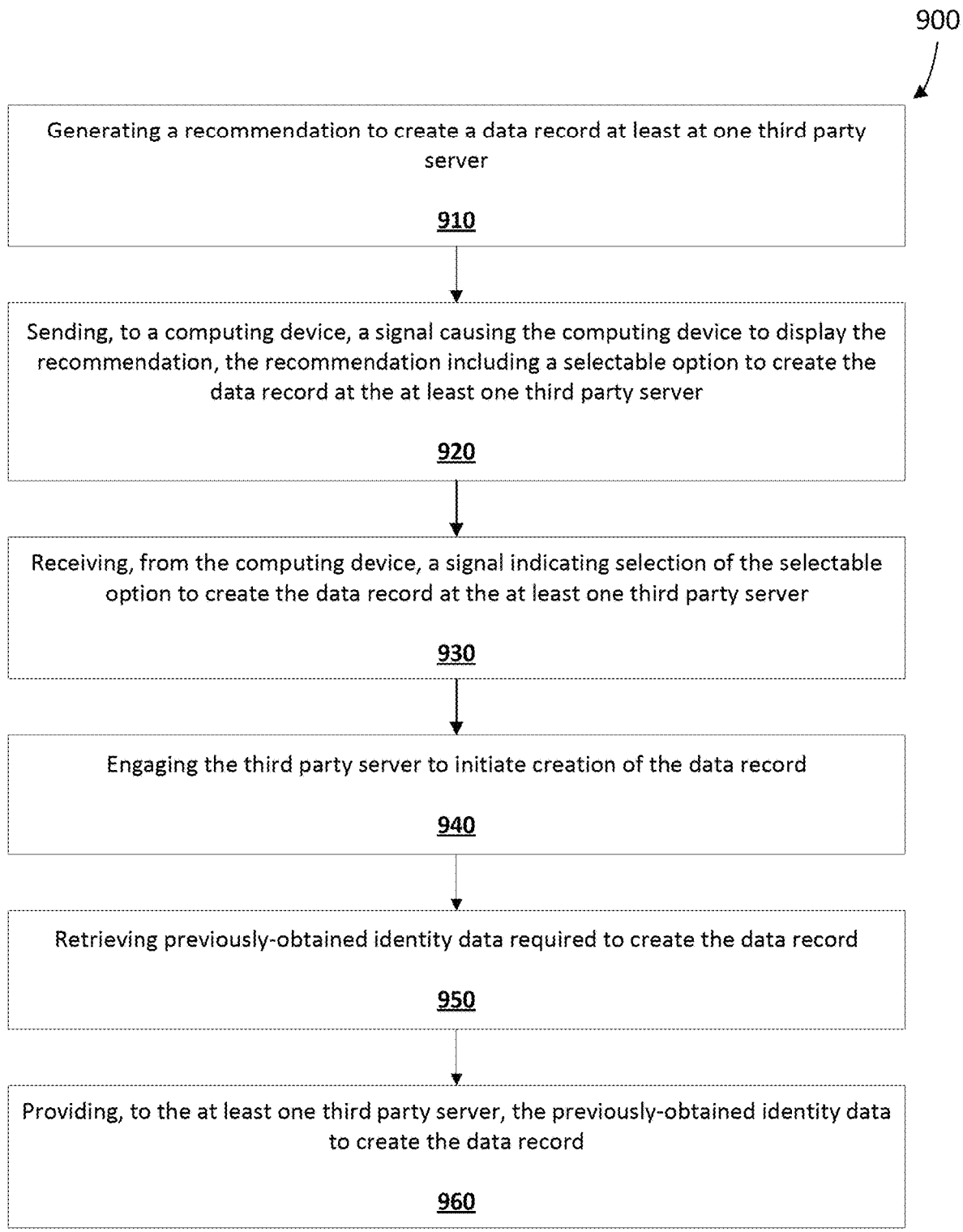
FIG. 9 shows, in flowchart form, an example method for initiating data record creation at a third party server.

Reference is made to FIG. 9, which illustrates, in flowchart form, a method 900 for initiating data record creation at a third party server. The method 900 may be implemented by a computing device having suitable processor-executable instructions for causing the computing device to carry out the described operations. The method 900 may be implemented, in whole or in part, by the server computer system 120. The server computer system 120 may off-load some operations of the method 900 to the computing device 110 (FIG. 1).

The method 900 includes generating a recommendation to create a data record at least at one third party server (step 910).

In this embodiment, the recommendation may be generated based on one or more additional third party servers that maintain another data record for the user associated with the computing device 110. Put another way, the recommendation may be generated based on what accounts the user has linked to the bill management hub. The server computer system 120 may determine or identify the one or more additional third party servers based on what accounts the user has linked.

In this embodiment, the server computer system 120 may engage an artificial intelligence recommendation engine to generate the recommendation and this may be based on the one or more additional third party servers. The server computer system 120 may provide the artificial intelligence recommendation engine with access to the database 140 which may include a list of providers and may include a list of all users or customers that have an account with the financial institution associated with the server computer system 120 and/or a list of all users or customers who have linked accounts to the bill management hub. The list of all users or customers may not identify the users or customers by name, but may include demographic data associated with the users or customers. For example, the list may include the age and location of each user or customer.

The artificial intelligence recommendation engine may utilize machine learning techniques to generate the recommendations. Specifically, the artificial intelligence recommendation engine may utilize machine learning algorithms that may include collaborative and/or content-based filtering. The artificial intelligence recommendation engine may generate the recommendations in real-time or near-real-time and this may be done each time the user has accessed the bill management hub.

Using the data obtained from the database 140, the artificial intelligence recommendation engine may filter the data to provide relevant recommendations to the user. Filtering the data may include utilizing a content-based filter, cluster analysis and/or a collaborative filter.

The recommendations include a recommendation to create a data record at a third party server. Put another way, the recommendations include a recommendation to open an account at a provider that the user does not already have an account with.

The artificial intelligence recommendation engine may filter the data to identify one or more third party servers associated with one or more providers that the user is likely to be interested in. For example, the user may have linked an account associated with a particular streaming service and an account associated with a particular cable television provider. Using data obtained from the database 140, the artificial intelligence recommendation engine may generate a recommendation to open an account with a second particular streaming service and this may be based on the fact that users or customers within a same demographic of the user have recently opened or linked accounts with the second particular streaming service.

The method 900 includes sending, to a computing device, a signal causing the computing device to display the recommendation, the recommendation including a selectable option to create the data record at the at least one third party server (step 920).

Once the recommendation has been generated, the server computer system 120 may obtain the recommendation from the artificial intelligence recommendation engine and may send a signal causing the computing device 110 to display the recommendation. The signal may cause the computing device 110 to update the bill management interface to include the recommendation. For example, the interface 800 shown in FIG. 8 may be updated to include the recommendation.

Figure 10:
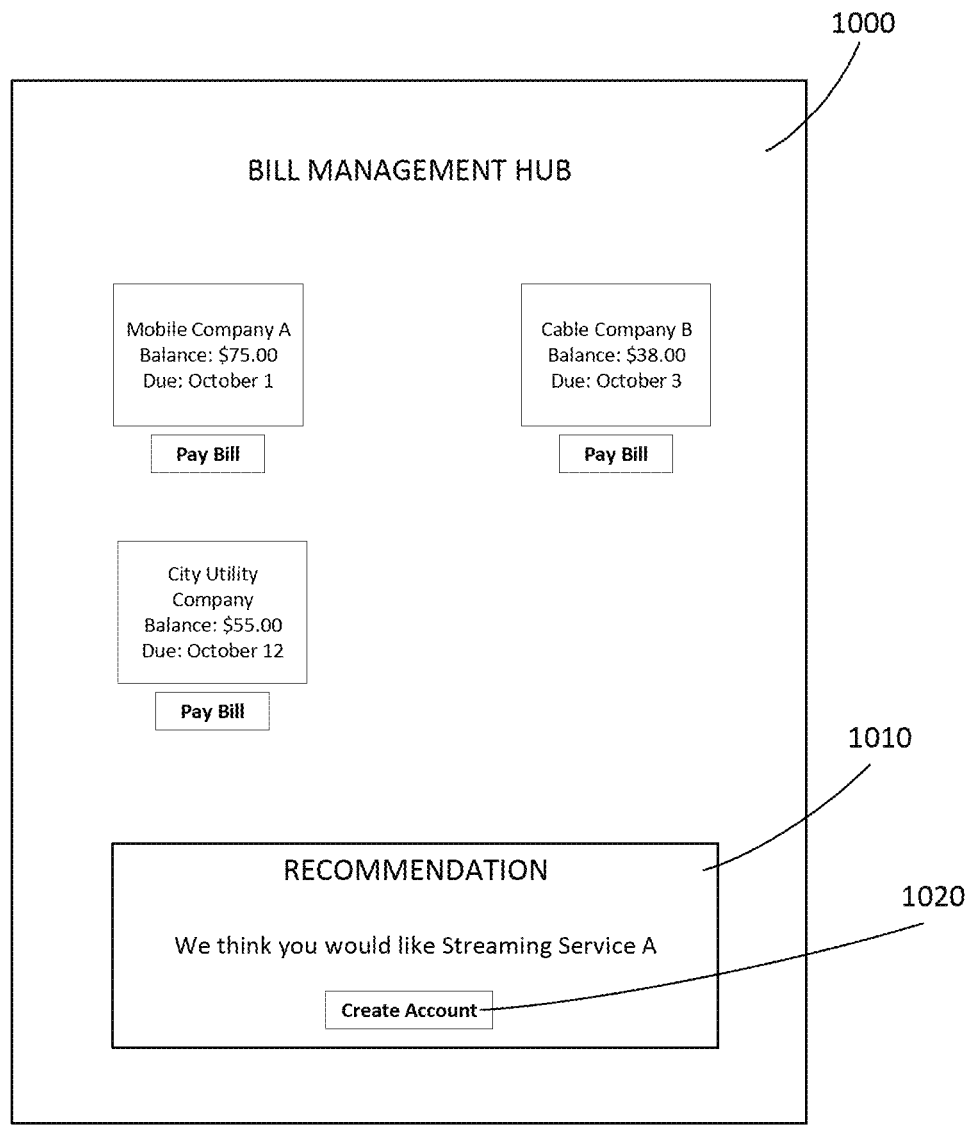
FIG. 10 is another example user interface.

An example user interface 1000 that includes a recommendation 1010 is shown in FIG. 10. As can be seen, in this example, the recommendation 1010 is a recommendation to create a data record at a third party server associated with Streaming Service A. Put another way, the recommendation 1010 is a recommendation to open an account with Streaming Service A. The recommendation 1010 includes a selectable option 1020 that, when selected, indicates that the user would like to create a data record and thus open an account with Streaming Service A.

In the example shown in FIG. 10, the interface is updated such that the recommendation is displayed within a specific portion of the bill management interface. The specific portion may correspond to the location of the recommendation 1010. Put another way, a portion of the bill management interface may be reserved to display notifications. In the event that the user has linked a large number of accounts to the bill management hub, a size of the graphic elements associated with each linked account may be automatically adjusted to ensure all graphic elements fit within the bill management interface while a portion of the bill management interface remains reserved to display recommendations. The portion reserved to display recommendations may be located, for example, at the top of the bill management interface or at the bottom of the bill management interface.

Figure 11:
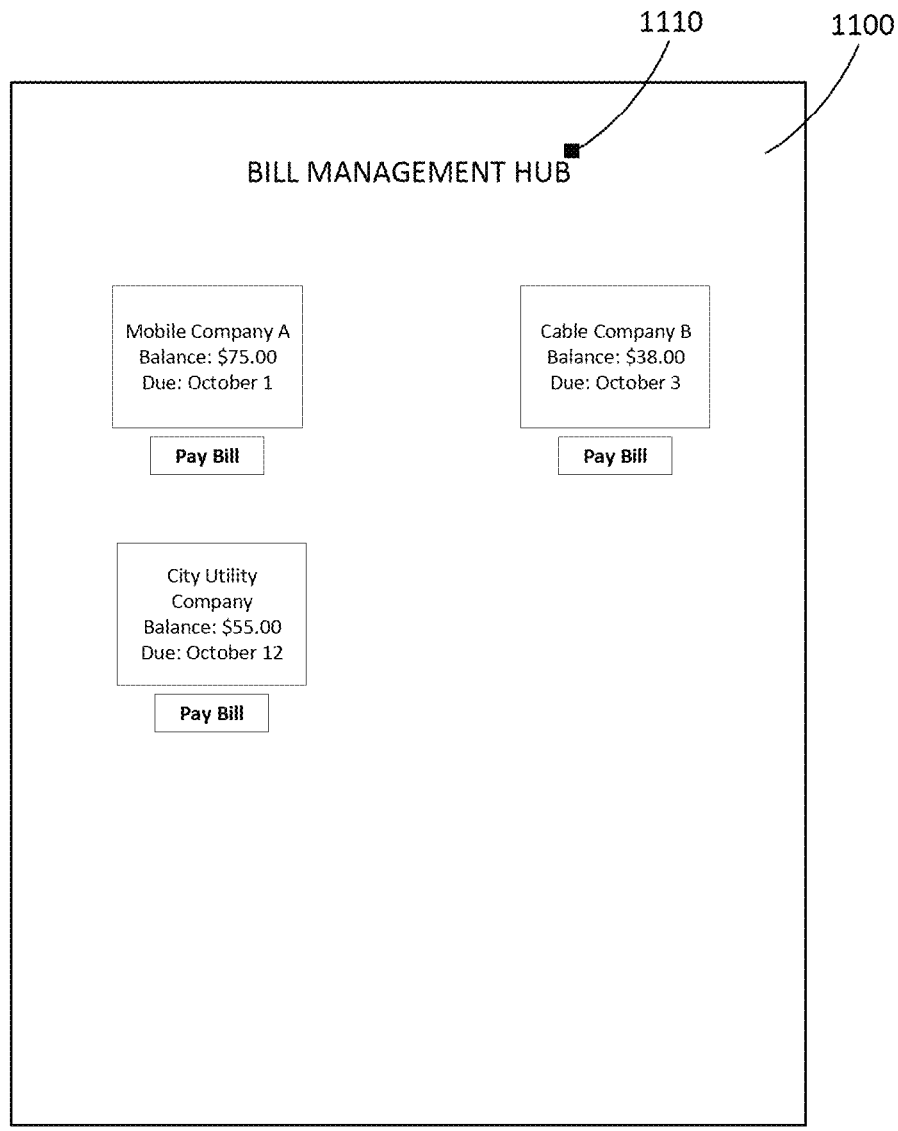
FIG. 11 is another example user interface.

In another example, the notification may be displayed as an indicator, where the indicator is selectable to view more information. An example user interface 1100 that includes an indicator 1110 is shown in FIG. 11. The indicator 1110 is positioned within the user interface 1100 at a location likely to get the attention of the user. The indicator 1110 may be displayed with animation features to further get the attention of the user. For example, the indicator 1110 may be animated such that it appears to sparkle or bounce while being displayed on the user interface 1100. Other animation features may be used. The indicator may be of any shape such as for example a star shaped, a rectangle, a circle, etc. and may be of any colour such as black, blue, yellow, etc.

The indicator 1110 is selectable. For example, the user may perform a tap gesture at a location on a display screen of the computing device 110 to select the indicator 1110. Responsive to the user selecting the indicator 1110, the server computer system 120 and/or the computing device 110 may provide further information regarding the notification. For example, a pop-up window may be displayed that may be similar to the recommendation 1010 shown in FIG. 10 and may also include a selectable option to create the data record. In the example shown in FIG. 11, by displaying the notification as an indicator, the amount of space within the interface to display graphic elements associated with linked accounts is maximized as there is no reserved portion of the user interface for displaying recommendations.

The method 900 includes receiving, from the computing device, a signal indicating selection of the selectable option to create the data record at the at least one third party server (step 930).

Responsive to the user selecting the selectable option to create the data record at the at least one third party server, the computing device 110 may send a signal to the server computer system 120 indicating selection of the selectable option.

The method 900 includes engaging the third party server to initiate creation of the data record (step 940).

Responsive to receiving the signal indicating selection of the selectable option to create the data record, the server computer system 120 may engage the third party server to initiate creation of the data record.

In one or more embodiments, the server computer system 120 may engage an application programming interface (API) associated with the third party server to initiate the creation of the data record.

A minimum amount of identity data may be required to initiate the creation of the data record. For example, the third party server may require a name, an email address and a mailing address of the user prior to creating the data record. As such, the server computer system 120 may identify or determine what identity data is required to create the data record. The server computer system 120 may request this information from the third party server, either directly or via the API, or may have previously stored this information in memory such as in the database 140.

The method 900 includes retrieving previously-obtained identity data required to create the data record (step 950).

The previously-obtained identity data may be retrieved from a data store, a digital identity network, at least one additional third party server and/or an API associated with at least one additional third party server. As will be described, it may be that at least some of the identity data is not available and as such the server computer system 120 may request this information from the user.

The data store may include the database 140 and as such the previously-obtained identity data may include data obtained by the server computer system 120 and stored in the database 140. For example, to open an account with the financial institution associated with the server computer system 120, the financial institution may have had to verify identity data of the user or customer to fulfill know-your-customer (KYC) requirements. As such, this verified identity data may be stored in the database 140 and may be retrieved by the server computer system 120 and used to create the data record.

The server computer system 120 may request previously-obtained identity data from a digital identity network. The digital identity network may be a blockchain network which includes a number of nodes. The blockchain network is a decentralized peer-to-peer network in which nodes may maintain respective copies of an append-only ledger.

The blockchain network may be a permissioned blockchain network in which only authorized nodes are permitted to add blocks to the blockchain. For example, only verified nodes may be granted permission to write to the blockchain. The verified nodes may be trusted nodes such as nodes associated with government organizations or other trusted entities such as banks. By way of example, the verified nodes may be associated with a driver's license bureau, a credit bureau, a government identity issuing office such as a passport office or birth registry office, or an office of another type. Given ones of these nodes may maintain identity records of various types. For example, a node associated with a passport office may maintain digital passport records, a node associated with a driver's license bureau may maintain digital licensing records, a node associated with a credit bureau may maintain digital credit records, and a node associated with a bank may maintain digital banking records. Various verified nodes may maintain contact information records which may, for example, specify an email address, postal address, telephone number, or other type of contact information.

Accordingly, at least some verified nodes may write to the blockchain. At least some of the blocks written to the blockchain may be related to identity data. The digital identity network may store identity data associated with a plurality of users. In at least some embodiments, identity data representing personal information may not be included in the blockchain. Instead, the blocks may store a private secret that is related to such identity data. The private secret may act as proof to the existence of the identity data and may be used to verify the authenticity of the data. For example, in at least some embodiments, the private secret may be a hash of the identity data such that, when the identity data is received from another system (i.e., a system apart from the verified node maintaining the digital identity data), it may be verified from the hash stored in a block on the blockchain. For example, in retrieving identity data from the digital identity network, the server computer system 120 may obtain the identity data from another system and may use the data on the blockchain to verify such data.

The blockchain network may, for example, be implemented using Hyperledger Fabric, for example. It will, however, be appreciated that the blockchain network may take other forms.

The server computer system 120 may request previously-obtained identity data from at least one additional third party server. The at least one additional third party server may be a third party server that hosts an account linked to the bill management hub by the user. The at least one third party server may be accessed by the server computer system 120 directly or via an API. It will be appreciated that at least some identity data may have already been obtained from the at least one additional third party server by the server computer system 120. For example, the account data obtained during method 500 described herein may include identity data. The server computer system 120 may additionally or alternatively obtain the previously-obtained identity data from the at least one additional third party server using the authentication information obtained when the account was linked to the bill management hub.

It will be appreciated that the previously-obtained identity data may be obtained from different sources. For example, the server computer system 120 may retrieve the user's name and mailing address from the database 140 and may retrieve, using the name and the mailing address of the user, a credit score of the user from the digital identity network.

The server computer system 120 may execute instructions that attempt to obtain the required identity data in an order that reduces the reliance on computing resources such as network traffic. Put another way, in an effort to reduce the reliance on computing resources, the server computer system 120 may attempt to retrieve the identity data locally prior to requesting the identity data through the network. For example, the server computer system 120 may attempt to retrieve the identity data from the database 140. The server computer system 120 may determine that at least some of the required identity data is not available from the database 140 and may then attempt to retrieve the identity data from the account data obtained during method 500 described herein. The server computer system 120 may determine that at least some of the required identity data is not available from the account data, and may request or obtain the identity data from the at least one additional third party server and may use the authentication information to do so. The server computer system 120 may determine that at least some of the required identity data is not available from the at least one additional third party server, and may request the required identity data from the digital identity network. As such, the server computer system 120 may sequentially attempt to obtain the required identity data and this may be done in an effort to reduce the reliance on computing resources such as network traffic.

Figure 12:
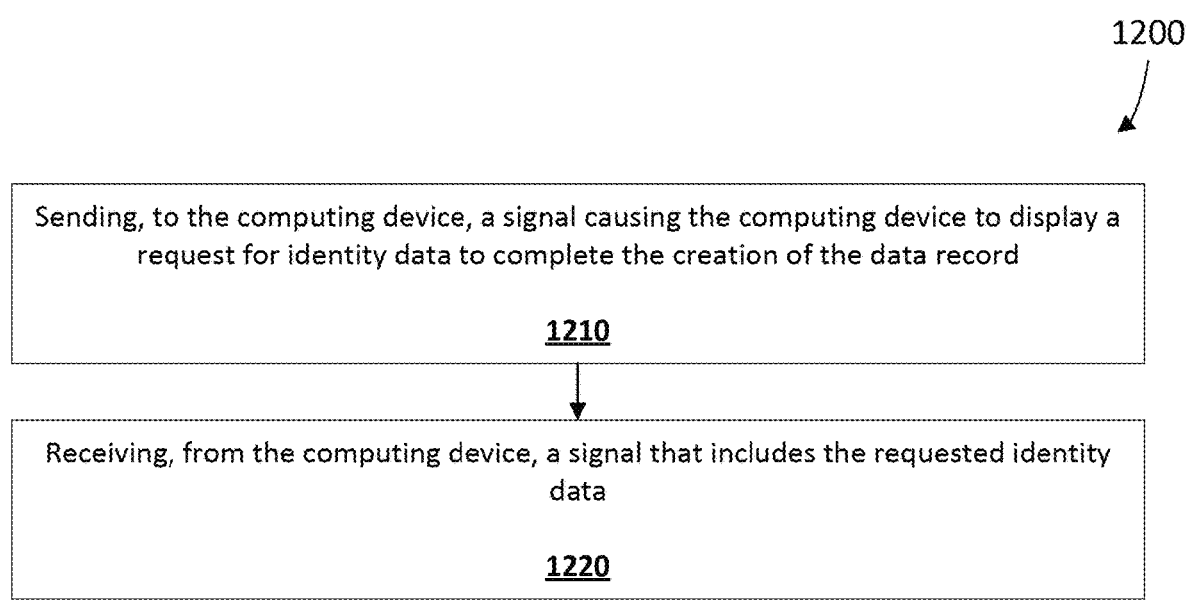
FIG. 12 shows, in flowchart form, an example method for obtaining identity data.

In at least some embodiments, the server computer system 120 may determine that at least some of the required identity data is not available and as such may request the identity data from the user directly. Reference is made to FIG. 12, which illustrates, in flowchart form, a method 1200 for obtaining identity data. The method 1200 may be implemented by a computing device having suitable processor-executable instructions for causing the computing device to carry out the described operations. The method 1200 may be implemented, in whole or in part, by the server computer system 120. The server computer system 120 may off-load some operations of the method 1200 to the computing device 110 (FIG. 1).

The method 1200 includes sending, to the computing device, a signal causing the computing device to display a request for identity data to complete the creation of the data record (step 1210).

In one or more embodiments, the signal may cause the computing device 110 to display a window that includes one or more input fields to be completed by the user. The user may complete the input fields using, for example, a keyboard displayed on a display screen of the computing device 110. The window may include a selectable option that, when selected, sends a signal that includes the identity data as entered by the user.

In another embodiment, the signal may cause the computing device 110 to display a window that includes one or more selectable options that, when selected, directs the computing device 110 to a particular mobile application or website. For example, the required identity data may include a credit score of the user. As such, the one or more selectable options may direct the computing device 110 to a particular mobile application or website associated with retrieving the credit score of the user. The user may log into the mobile application or website and the computing device 110 and/or the server computer system 120 may obtain the credit score from the mobile application or the computing device 110 using, for example, screen scraping or other techniques.

The method 1200 includes receiving, from the computing device, a signal that includes the requested identity data (step 1220).

The server computer system 120 receives, from the computing device 110, a signal that includes the requested identity data. For example, the signal may include the identity data as entered by the user in the one or more input fields. As another example, the signal may include data obtained via screen scraping.

The server computer system 120 may store the obtained identity data in the database 140.

The method 900 includes providing, to the at least one third party server, the previously-obtained identity data to create the data record (step 960).

The server computer system 120 sends the previously obtained identity data to the at least one third party server to create the data record. In an embodiment, the server computer system 120 may send a signal that includes the previously-obtained identity data and a request to create the data record to the at least one third party server. In another embodiment, the server computer system 120 may generate an API request that includes the previously-obtained identity data and the request to create the data record and may send the API request to the API associated with the third party server.

Responsive to receiving the identity data, the at least one third party server may create the data record. Put another way, using the identity data, the at least one third party server may perform operations to open or create an account for the user.

The at least one third party server may require that the user generate a username and password associated with the account and as such the at least one third party server may send a signal to the server computer system 120 requesting that a username and password be provided. In response, the server computer system 120 may obtain the username and password used for the account hosted by the server computer system 120 and may send, in an encrypted data format, the username and password to be used. Alternatively, the server computer system 120 may send a signal causing the computing device 110 to display a window that includes one or more input fields that can be used to enter a desired username and password. In another embodiment, the at least one third party server may email the user which may include instructions to provide a username and password for the account.

Figure 13:
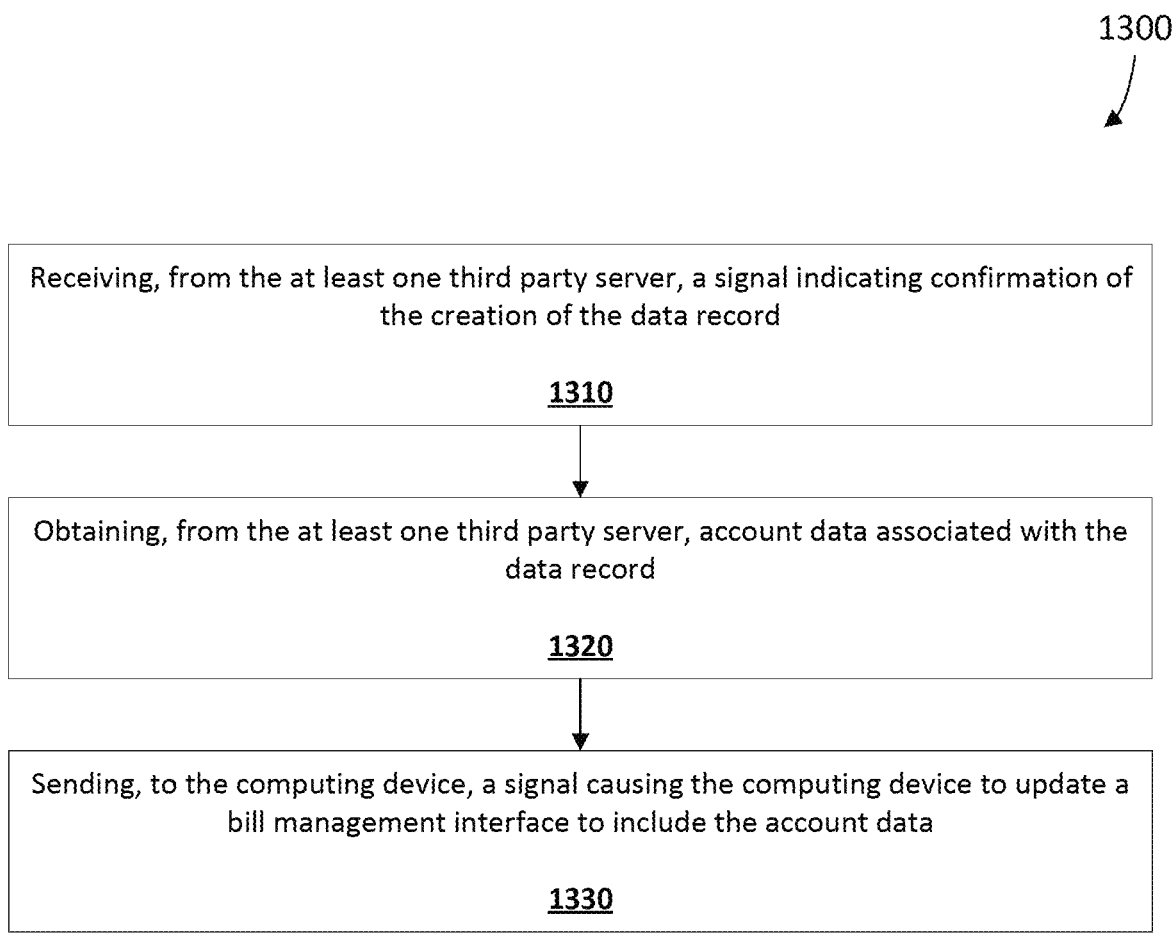
FIG. 13 shows, in flowchart form, an example method for updating a bill management interface.

Once the data record has been created, operations are performed to update the bill management interface. Reference is made to FIG. 13, which illustrates, in flowchart form, a method 1300 for updating a bill management interface. The method 1300 may be implemented by a computing device having suitable processor-executable instructions for causing the computing device to carry out the described operations. The method 1300 may be implemented, in whole or in part, by the server computer system 120. The server computer system 120 may off-load some operations of the method 1300 to the computing device 110 (FIG. 1).

The method 1300 includes receiving, from the at least one third party server, a signal indicating confirmation of the creation of the data record (step 1310).

Responsive to creating the data record, the at least one third party server may send a signal to the server computer system 120 indicating confirmation of the creation of the data record.

The method 1300 includes obtaining, from the at least one third party server, account data associated with the data record (step 1320).

The server computer system 120 obtains, from the at least one third party server, account data associated with the data record. The account data may be obtained from the at least one third party server once the data record creation has completed or may be requested by the server computer system 120 in response to receiving the signal indicating confirmation of the creation of the data record.

Similar to that described above, the account data may include, for example, a balance owing on the account, a due date for paying the balance owing on the account, usage data such as for example internet usage data, etc.

The method 1300 includes sending, to the computing device, a signal causing the computing device to update a bill management interface to include the account data (step 1330).

The server computer system 120 sends a signal that causes the computing device 110 to update the bill management interface to include the account data. For example, where the account data includes a balance of the account and a due date for when the balance is to be paid, the bill management interface may be updated to display the account data.

Figure 14:
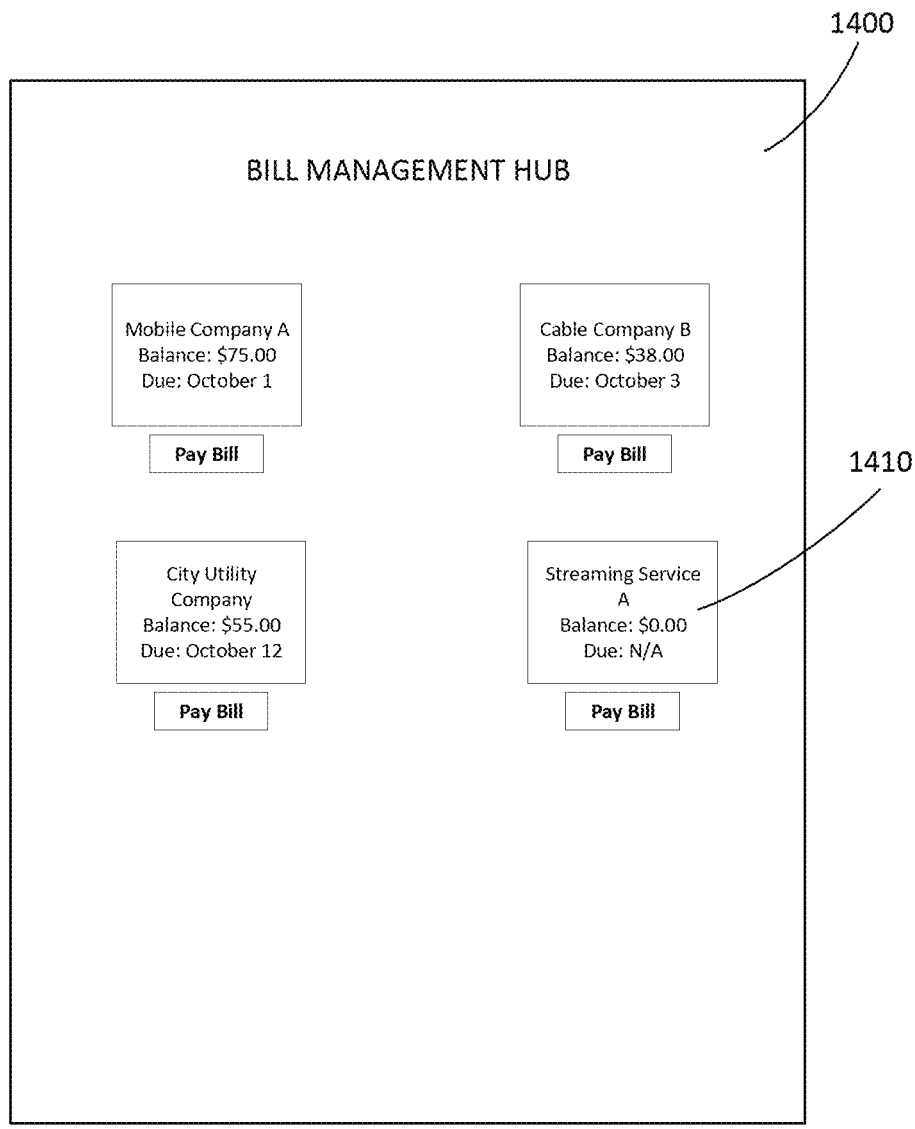
FIG. 14 is another user interface.

An example interface 1400 is shown in FIG. 14. The example interface 1400 is an updated version of the interface 800. As can be seen, the updated interface 1400 includes a graphic element 1410 that includes the account data of the newly opened account. Specifically, the graphic element 1410 includes identifying information of the provider ("Streaming Service A") and the account data which in this example is a balance of the account ($0.00) and the due date for when payment is to be made (N/A). It will be appreciated that the balance of the account and the due date are reflective of the fact that the account has just been opened.

Once data record creation has completed, the server computer system 120 may select a default account to be used to pay the bill for the data record. For example, the server computer system 120 may select a chequing account or credit card account associated with the user and this may be used to pay the bill for the data record. Within the bill management hub, the user may select a different account that is to be used for payment.

Figure 15:
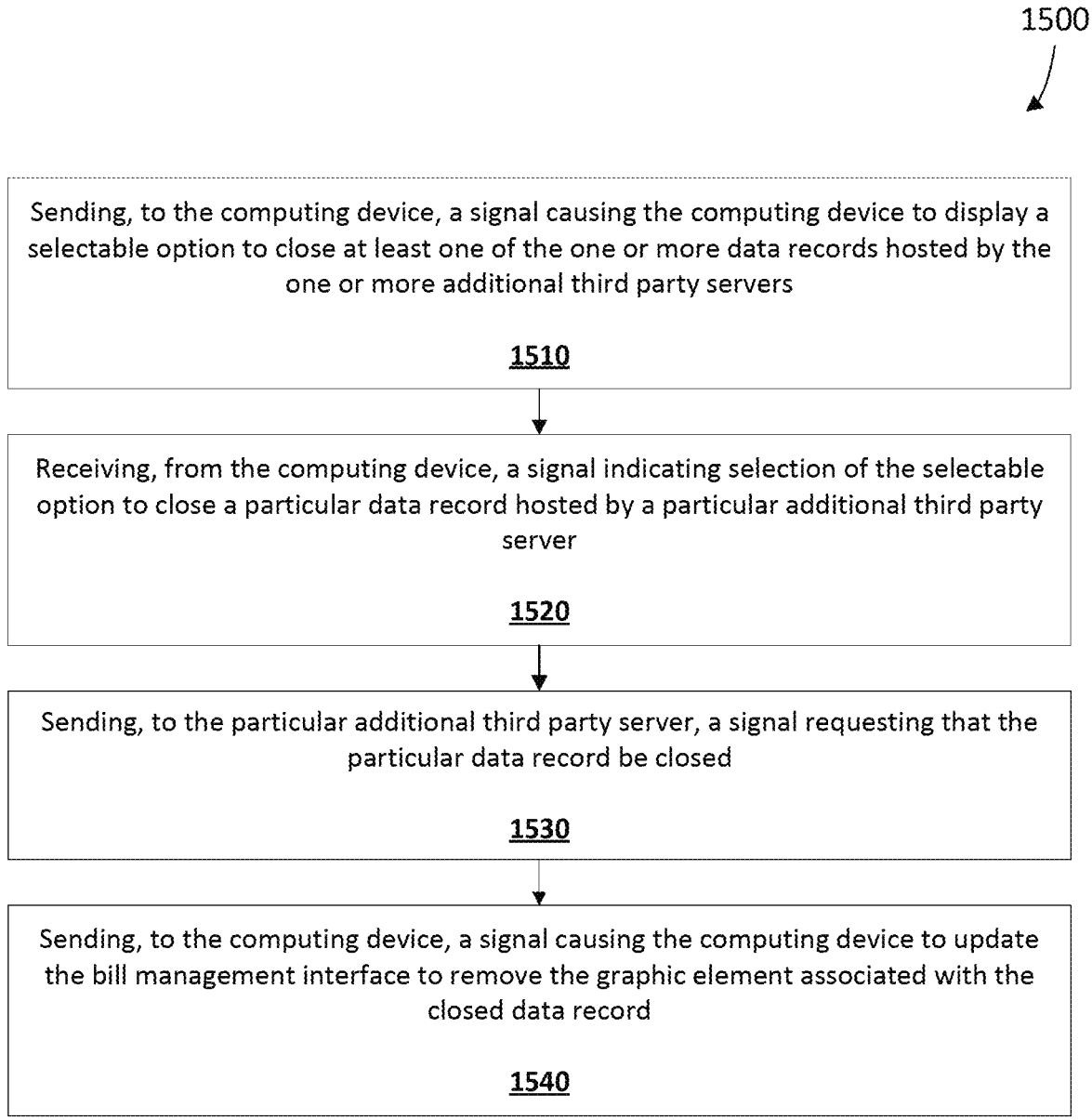
FIG. 15 shows, in flowchart form, an example method for initiating data record closing.

It will be appreciated that the bill management hub may be configured to perform additional account management functions. For example, as mentioned, the graphic elements displayed on the bill management interface may be selectable by the user. Responsive to the user selecting a graphic element, the computing device 110 may display a settings or configuration page that may be used by the user to update or change one or more settings associated with their account. The settings or configuration page may include a selectable option to initiate the closing of the account. Reference is made to FIG. 15, which illustrates, in flowchart form, a method 1300 for initiating data record closing. The method 1500 may be implemented by a computing device having suitable processor-executable instructions for causing the computing device to carry out the described operations. The method 1500 may be implemented, in whole or in part, by the server computer system 120. The server computer system 120 may off-load some operations of the method 1500 to the computing device 110 (FIG. 1).

The method 1500 includes sending, to the computing device, a signal causing the computing device to display a selectable option to close at least one of the data records hosted by one or more additional third party servers (step 1510).

As mentioned, responsive to the user selecting a graphic element by performing, for example, a tap gesture at a location on a display screen of the computing device 110 corresponding to the graphic element, the server computer system 120 may send a signal causing the computing device to display a selectable option to close a particular account. The selectable option may be included with the settings or configuration page, for example.

The method 1500 includes receiving, from the computing device, a signal indicating selection of the selectable option to close a particular data record hosted by a particular third party server (step 1520).

Responsive to the user selecting the selectable option, the computing device 110 sends a signal to the server computer system 120 indicating selection of the selectable option. Based on the selection, the server computer system 120 may identify which account is to be closed and may then identify the particular third party server.

The method 1500 includes sending, to the particular third party server, a signal requesting that the particular data record be closed (step 1530).

The server computer system 120 sends a signal to the third party server requesting that the particular data record be closed. Put another way, the signal requests that the account be closed. In an embodiment, the server computer system 120 may send the signal to the at least one third party server or may generate an API request that requests that the account be closed and may send the API request to the API associated with the third party server.

Responsive to receiving the signal, the third party server may take steps to close the account and/or delete the data record associated with the account. It will be appreciated that the closing of the account may not be immediate, as the user may have paid for a service up until a particular date. As such, the account data displayed within the bill management interface may be updated to indicate the date on which the account is to be closed.

Once the account is closed, the server computer system 120 may send a signal to the computing device 110 to update the bill management interface to remove the graphic element associated with the closed data record (step 1540).

Responsive to receiving the signal, the computing device 110 may update the bill management interface to remove the graphic element associated with the closed account.

In another example, the server computer system 120 may negotiate or attempt to reduce the cost associated with a particular data record, service or account. For example, the server computer system 120 may monitor identity data of the user such as for example a credit score of the user. Responsive to the credit score going above a threshold score, the server computer system 120 may send a signal to a third party server requesting that a cost associated with a service be reduced based on the fact that the credit score of the user is above the threshold score. In another example, the server computer system 120 may send a request to reduce a cost associated with a particular service and this may be done periodically. For example, every six (6) months the server computer system 120 may send a request to reduce the cost.

In another example, the bill management interface may include a selectable option to negotiate the cost of a particular service. In this example, the selectable option may only be displayed once a year and, once selected by the user, may not be displayed for another year. In this manner, the user may request that the server computer system 120 negotiate a particular cost or bill on their behalf and this may only be requested once per year.

In another example, the server computer system 120 may offer discounts to the user within the bill management hub. For example, a particular third party server may wish to offer a discount to a particular group of users at the financial institution associated with the server computer system 120. The particular group of users may be of a same demographic. The demographic may include users that have a particular annual salary, users that have a credit score above a threshold, users of a certain age, users of a certain marital status, users that share a common postal code, users within a same city, etc. As one example, an internet service provider may have expanded service to a new postal code. The internet service provider may wish to send a promotion to as many people within the new postal code. As such, the internet service provider may utilize the financial institution associated with the server computer system 120 to send the offer to all users within the new postal code that are also customers of the financial institution. The offer may be presented in the bill management hub in manners similar to that described herein. For example, the offer may be presented in a manner similar to the recommendations described herein.

Offers may be presented to the user based on historical data. For example, a user may have a perfect track record of paying off their bills on time. As such, a provider may wish to offer this user a discount for their service.

The methods described herein may be modified and/or operations of such methods combined to provide other methods.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the herein discussed embodiments are considered to be illustrative and not restrictive.

What is claimed is:

1. A server computer system comprising:
   a processor;
   a communications module coupled to the processor; and
   a memory coupled to the processor, the memory storing instructions that, when executed, configure the processor to:
   generate a recommendation to create a data record at least at one third party server;
   send, via the communications module and to a computing device, a signal causing the computing device to display the recommendation, the recommendation including a selectable option to create the data record at the at least one third party server;
   receive, via the communications module and from the computing device, a signal indicating selection of the selectable option to create the data record at the at least one third party server;
   engage, via the communications module, the third party server to initiate creation of the data record;
   retrieve previously-obtained identity data required to create the data record;
   provide, via the communications module and to the at least one third party server, the previously-obtained identity data to create the data record;
   receive, via the communications module and from at least one third party server, a signal indicating confirmation of the creation of the data record;
   obtain, via the communications module and from the at least one third party server, account data associated with the account; and
   send, via the communications module and to the computing device, a signal causing the computing device to update a bill management interface to include the account data.

2. The server computer system of claim 1, wherein the previously-obtained identity data is retrieved from one or more of a data store, a digital identity network, or an application programming interface (API) associated with at least one additional third party server.

3. The server computer system of claim 2, wherein the at least one additional third party server maintains another data record for a user associated with the computing device.

4. The server computer system of claim 1, wherein the instructions, when executed, further configure the processor to:
   determine that the previously-obtained identity data is not sufficient to complete the creation of the data record;
   send, via the communications module and to the computing device, a signal causing the computing device to display a request for identity data to complete the creation of the data record;
   receive, via the communications module and from the computing device, a signal that includes the requested identity data; and
   provide, via the communications module and to the at least one third party server, the requested identity data.

5. The server computer system of claim 1, wherein when generating the recommendation to create the data record at the at least one third party server, the instructions, when executed, further configure the processor to:
   determine one or more additional third party servers that maintain a data record for a user associated with the computing device; and
   generate the recommendation based on the one or more additional third party servers.

6. The server computer system of claim 1, wherein the instructions, when executed, further configure the processor to:
   obtain authentication information for one or more data records hosted by one or more additional third party servers;
   obtain, via the communications module and from the one or more additional third party servers, account data associated with the one or more data records; and
   sending, via the communications module and to the computing device, a signal causing the computing device to update a bill management interface to include the account data.

7. The server computer system of claim 6, wherein the instructions, when executed, further configure the processor to:
   send, via the communications module and to the computing device, a signal causing the computing device to display a selectable option to close at least one of the one or more data records hosted by the one or more additional third party servers;
   receive, via the communications module and from the computing device, a signal indicating selection of the selectable option to close a particular data record hosted by a particular additional third party server; and
   send, via the communications module and to the particular additional third party server, a signal requesting that the particular data record be closed.

8. The server computer system of claim 1, wherein the instructions, when executed, further configure the processor to:
   engage an application programming interface (API) associated with the third party server to initiate the creation of the data record;
   generate an API request that includes the previously-obtained identity data; and
   send, via the communications module and to the API associated with the third party server, the generated API request.

9. The server computer system of claim 1, wherein the account data includes an amount owing and the signal causing the computing device to update the bill management interface causes the computing device to display a selectable option to submit payment based on the amount owing.

10. The server computer system of claim 1, wherein the instructions, when executed, further configure the processor to:
    send, via the communications module and to the third party server, a signal including a request to reduce a cost associated with the data record based on at least some of the previously-obtained identity data satisfying predefined criteria.

11. A method comprising:
    generating a recommendation to create a data record at least at one third party server;
    sending, to a computing device, a signal causing the computing device to display the recommendation, the recommendation including a selectable option to create the data record at the at least one third party server;
    receiving, from the computing device, a signal indicating selection of the selectable option to create the data record at the at least one third party server;
    engaging the third party server to initiate creation of the data record;
    retrieving previously-obtained identity data required to create the data record;
    providing, to the at least one third party server, the previously-obtained identity data to create the data record;
    receiving, from at least one third party server, a signal indicating confirmation of the creation of the data record;
    obtaining, from the at least one third party server, account data associated with the account; and
    sending, to the computing device, a signal causing the computing device to update a bill management interface to include the account data.

12. The method of claim 11, wherein the previously-obtained identity data is retrieved from one or more of a data store, a digital identity network, or an application programming interface (API) associated with at least one additional third party server.

13. The method of claim 11, further comprising:
    determining that the previously-obtained identity data is not sufficient to complete the creation of the data record;
    sending, to the computing device, a signal causing the computing device to display a request for identity data to complete the creation of the data record;
    receiving, from the computing device, a signal that includes the requested identity data; and
    providing, to the at least one third party server, the requested identity data.

14. The method of claim 11, wherein generating the recommendation to create the data record at the at least one third party server includes:
    determining one or more additional third party servers that maintain a data record for a user associated with the computing device; and
    generating the recommendation based on the one or more additional third party servers.

15. The method of claim 11, further comprising:
    obtaining authentication information for one or more data records hosted by one or more additional third party servers;
    obtaining, from the one or more additional third party servers, account data associated with the one or more data records; and sending, to the computing device, a signal causing the computing device to update a bill management interface to include the account data.

16. The method of claim 15, further comprising:

sending, to the computing device, a signal causing the computing device to display a selectable option to close at least one of the one or more data records hosted by the one or more additional third party servers;

receiving, from the computing device, a signal indicating selection of the selectable option to close a particular data record hosted by a particular additional third party server; and sending, to the particular additional third party server, a signal requesting that the particular data record be closed.

17. The method of claim 11, further comprising:

engaging an application programming interface (API) associated with the third party server to initiate the creation of the data record;

generating an API request that includes the previously-obtained identity data; and sending, to the API associated with the third party server, the generated API request.

18. A non-transitory computer readable storage medium comprising processor-executable instructions which, when executed, configure a processor to:

generate a recommendation to create a data record at least at one third party server;

send, via a communications module and to a computing device, a signal causing the computing device to display the recommendation, the recommendation including a selectable option to create the data record at the at least one third party server;

receive, via the communications module and from the computing device, a signal indicating selection of the selectable option to create the data record at the at least one third party server;

engage, via the communications module, the third party server to initiate creation of the data record;

retrieve previously-obtained identity data required to create the data record;

provide, via the communications module and to the at least one third party server, the previously-obtained identity data to create the data record;

receive, via the communications module and from at least one third party server, a signal indicating confirmation of the creation of the data record;

obtain, via the communications module and from the at least one third party server, account data associated with the account; and send, via the communications module and to the computing device, a signal causing the computing device to update a bill management interface to include the account data.

19. The method of claim 11, wherein the account data includes an amount owing and the signal causing the computing device to update the bill management interface causes the computing device to display a selectable option to submit payment based on the amount owing.

20. The method of claim 11, further comprising:

send, to the third party server, a signal including a request to reduce a cost associated with the data record based on at least some of the previously-obtained identity data satisfying predefined criteria.

\* \* \* \* \*